(12) United States Patent
Liu et al.

(10) Patent No.: US 11,063,263 B2
(45) Date of Patent: Jul. 13, 2021

(54) ELECTRODE STRUCTURE INCLUDING ELECTRODE FIBER HAVING HIGHER DENSITY OF VERTICAL TOWS TO PARALLEL TOWS, FLOW BATTERY STACK INCLUDING THE SAME, AND SEALING STRUCTURE INCLUDING SEALING GASKETS CONNECTED BY SEALING WIRE

(71) Applicant: DALIAN RONGKEPOWER CO., LTD, Dalian (CN)

(72) Inventors: Shenglin Liu, Dalian (CN); Hongdong Jiang, Dalian (CN); Huamin Zhang, Dalian (CN); Xiangkun Ma, Dalian (CN); Tao Zhang, Dalian (CN); Shan Jiang, Dalian (CN); Zhenkun Yang, Dalian (CN); Dan Sun, Dalian (CN); Kuanrong Yi, Dalian (CN)

(73) Assignee: DALIAN RONGKEPOWER CO., LTD, Dalian (CN)

( * ) Notice: Subject to any disclaimer, the term of this patent is extended or adjusted under 35 U.S.C. 154(b) by 103 days.

(21) Appl. No.: 16/348,263

(22) PCT Filed: Nov. 3, 2017

(86) PCT No.: PCT/CN2017/109236
§ 371 (c)(1),
(2) Date: Jun. 18, 2019

(87) PCT Pub. No.: WO2018/086482
PCT Pub. Date: May 17, 2018

(65) Prior Publication Data
US 2019/0319274 A1  Oct. 17, 2019

(30) Foreign Application Priority Data

Nov. 9, 2016 (CN) .......................... 201610986518.6
Dec. 9, 2016 (CN) .......................... 201611132210.1

(51) Int. Cl.
*H01M 4/75* (2006.01)
*H01M 8/0273* (2016.01)
(Continued)

(52) U.S. Cl.
CPC ........... *H01M 4/75* (2013.01); *H01M 8/0273* (2013.01); *H01M 8/188* (2013.01); *H01M 2004/021* (2013.01)

(58) Field of Classification Search
CPC ....... H01M 4/75; H01M 8/0273; H01M 8/188
(Continued)

(56) References Cited

FOREIGN PATENT DOCUMENTS

JP  2007031912 A * 2/2007 ............. C11D 3/201
JP  2015122229 A * 7/2015
(Continued)

*Primary Examiner* — Sean P Cullen
(74) *Attorney, Agent, or Firm* — Hauptman Ham, LLP

(57) ABSTRACT

An electrode structure of a flow battery, a flow battery stack, and a sealing structure of the flow battery stack, wherein the density of the vertical tow in the electrode fiber is larger than the density of the parallel tow. In the electrode fiber per unit volume, the quantity ratio of the vertical tow to the parallel tow is at least 6:4. The electrode structure is composed of an odd number of layers of the electrode fibers, and the porosity of other layers is larger than the porosity of the center layer. The electrode structure is mainly composed of the vertical tows perpendicular to the surface of the electrode, so that, firstly, the contact area between the outer surface of the electrode and the adjacent component can be increased and the contact resistance can be reduced, secondly, the electrode is endowed with good mechanical properties, compared with the original structure, the contact resistance of such structure is reduced by 30%-50%; and the layers of the electrode have different thickness depending on the porosity, after compression, the layers with optimized thickness have a consistent porosity, this compressed uniform structure (Continued)

avoids uneven mass transfer phenomena when the electrolyte flows through the electrode, and reduces the concentration polarization of the battery and thereby improving the battery energy output under the given power.

3 Claims, 3 Drawing Sheets

(51) Int. Cl.
*H01M 8/18* (2006.01)
*H01M 4/02* (2006.01)

(58) Field of Classification Search
USPC ................................ 429/101, 233, 241, 245
See application file for complete search history.

(56) References Cited

FOREIGN PATENT DOCUMENTS

| | | | | |
|---|---|---|---|---|
| JP | 2015190066 A | * | 11/2015 | ............... H01M 4/96 |
| WO | WO-2018198252 A1 | * | 11/2018 | ............... H01M 8/02 |

* cited by examiner

ELECTRODE STRUCTURE INCLUDING ELECTRODE FIBER HAVING HIGHER DENSITY OF VERTICAL TOWS TO PARALLEL TOWS, FLOW BATTERY STACK INCLUDING THE SAME, AND SEALING STRUCTURE INCLUDING SEALING GASKETS CONNECTED BY SEALING WIRE

RELATED APPLICATIONS

The present application is a National Phase of International Application Number PCT/CN2017/109236, filed Nov. 3, 2017, and claims the priority of China Application No. 201610986518.6, filed Nov. 9, 2016; and China Application No. 201611132210.1, filed Dec. 9, 2016.

FIELD OF THE INVENTION

The present invention relates to the field of flow battery technology, and more particularly to an electrode structure of a flow battery and a flow battery stack.

BACKGROUND OF THE INVENTION

As a large-scale energy storage technology, the flow battery system has received extensive attention due to its advantages of reliability, safety, flexible location, independent design of capacity and power, etc. Stack is a main core component of the flow battery system, and its power performance directly affects the reliability, safety and cost of the entire flow battery system. The main factors affecting the power performance of the flow battery stack include ohmic polarization, electrochemical polarization and concentration polarization, wherein the electrochemical polarization and the concentration polarization are mainly affected by electrode materials, the electrolyte and operation conditions, and the ohmic polarization is mainly affected by conductivity of the electrode materials and the interaction of the contact resistance between the electrode material and the adjacent components. For a selected fixed battery material, the magnitude of the ohmic polarization of the flow battery only depends on the contact resistance between the electrode and the adjacent components (a bipolar plate/an ion membrane). High contact resistance may significantly limit properties of the flow battery such as discharge power and voltage efficiency.

Furthermore, the electrode material of the flow battery is usually porous carbon felt or graphite felt. After being assembled into a stack, a porosity of the carbon felt or the graphite felt varies in a thickness direction due to a pressing force applied on two sides, the porosity on both sides is much smaller than the porosity at the center, the unevenness of the porosity will result in a large difference in the flow rate and the resistance of the electrolyte at the center and at both sides of the surface of the electrode. This will lead to problems such as uneven electrolyte distribution, uneven electrochemical reaction, uneven current transfer and heat transfer in the flow battery stack, and reduce the energy efficiency and life of the stack.

BRIEF SUMMARY OF THE INVENTION

The present invention provides an electrode structure of a flow battery, aiming to solve the problems that the contact resistance between the traditional electrode and the adjacent component is large and the porosity of the traditional electrode structure is inconsistent after being assembled into a stack. The electrode of the flow battery is generally composed of multiple mutually continuous mesh-like porous structures (electrode fibers), wherein each layer structure is composed of parallel tows woven with at least two directions; the connection between the layered structures is made up of a vertical tow (perpendicular to the electrode surface). An electrode structure of a flow battery provided in the present invention includes an electrode fiber, wherein the density of the vertical tow in the electrode fiber is larger than the density of the parallel tow.

As a preferred technical solution, in the unit volume of the electrode fiber, the ratio of the number of the vertical tow to the parallel tow is at least 6:4.

As a preferred technical solution, the electrode structure is composed of at least three layers of the electrode fibers, and the other layers have a porosity greater than that of the center layer.

As a preferred technical solution, the number of layers of the electrode fiber is an odd number, and the porosity of each electrode fiber layer is outwardly increased from the center layer.

As a preferred technical solution, the porosity of the central electrode fiber is 90-93%; and the porosity of the electrode fiber of the other layers is 93-96%.

As a preferred technical solution, the number of the layers of the electrode fiber is three, five or seven.

As a preferred technical solution, the material of the electrode fibers is polyacrylonitrile-based and/or rayon-based material and/or pitch-based material. The electrode fiber of each layer can be selected from the same or different materials.

As a preferred technical solution, the ratio of the thickness of the electrode fiber of the center layer to the total thickness of the electrode is 20%-30%, the ratio of the thickness of the electrode fiber of one side to the total thickness of the electrode is 20%-45%, wherein when the flow battery stack is assembled, this side is close to the bipolar plate, and the ratio of the thickness of the electrode fiber of the other side to the total thickness of the electrode is 15%-35%, wherein when the flow battery stack is assembled, this side is close to the ionic membrane.

Another object of the present invention is to provide a flow battery stack, which is assembled by the aforementioned electrode structures, and after being compressed and assembled under the stack preload of 0.1-0.25 MPa, the porosity of the electrode fiber of each layer in the stack is compressed to 89-92%.

As a preferred technical solution, the difference in the porosity of the electrode fiber of each layer in the stack is less than 3%, preferably 1.5%.

In view of low consumption of the thin electrode at a high current density, the thickness of each layer is preferably no greater than 2.5 mm, and the total thickness of the electrode is preferably 3-6 mm. Depending to the different compression capacities of each layer, the thickness of the electrode fiber of each layer is preferably gradually decreased toward the center layer from the outside to the inside, and the thickness ratio of the other layers to the center layer is not less than 1.5:1.

A surface of the outermost electrode fiber of the electrode is a spinous or needlelike structure, and the height of the spinous or needlelike structure is different, which is in a high and low undulation. The spinous or needlelike structure is formed by the vertical tow perpendicular to the surface of the electrode, and the diameter of the vertical tow is 6-18 μm, preferably 7-15 μm.

Further, the electrode material is a three-layer structure, wherein the center layer is a rayon-based material, and the two sides are made of a polyacrylonitrile-based. To ensure the electrode fiber layer of the electrode in contact with the ion membrane and the bipolar plate is a polyacrylonitrile-based material. The advantage is the rayon-based fiber has a large specific surface area, and under the same conditions, it can provide more reactive regions between the electrolyte and the electrode than the polyacrylonitrile-based fiber.

The porosity of the present invention is a volume porosity, and specifically a ratio of the throughhole volume to an electrode material volume.

The two side layers of the present invention refer to two layers of the electrode fiber located at the outermost side of the electrode structure.

The center layer of the present invention refers to the electrode fiber layer located at the center of the electrode structure.

The other layers of the present invention refer to other electrode fiber layers other than the center layer, including the aforementioned two side layers.

The present invention has following beneficial effects:

1) The electrode structure of the present invention is mainly composed of the vertical tow perpendicular to the surface of the electrode, one can increase the contact area of the outer surface of the electrode and the adjacent components to reduce the contact resistance, second is to impart good mechanical properties to the electrode. Compared with the original structure, the contact resistance is reduced by 30%-50%.

2) The layers of the electrode have different thickness depending on the porosity, and the layers with optimized thickness have the same porosity after compression, and the uniform structure after compression avoids mass transfer unevenness when the electrolyte flows through the inside of the electrode, reducing the concentration polarization of the battery to increase the battery energy output under a given power.

3) The preparation process of the electrode structure is simple and easy to implement, and the power performance of the flow battery is optimized to the greatest extent with minimal production cost.

wherein: 1. The bipolar plate-side fiber layer; 2. The center fiber layer; 3. The ion membrane-side fiber layer; 4. The fiber layer between the bipolar plate-side fiber layer 1 and the center fiber layer 2; 5. The fiber layer between the center fiber layer 2 and the ion membrane-side fiber layer 3; 6. The ion membrane or bipolar plate.

Figure 5:
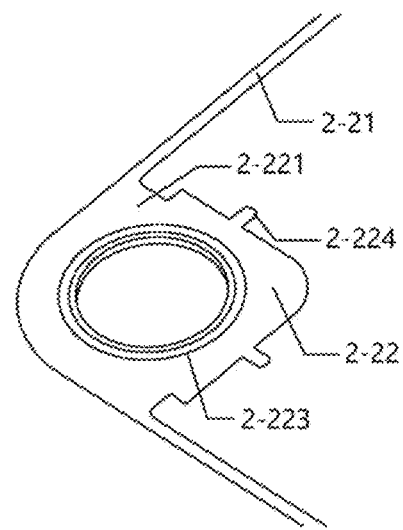
Figure 6:
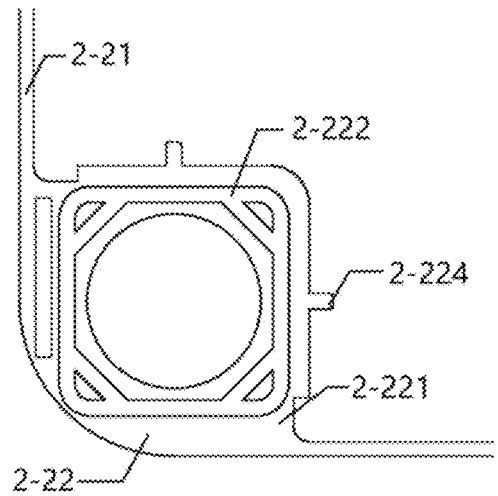
Figure 7:
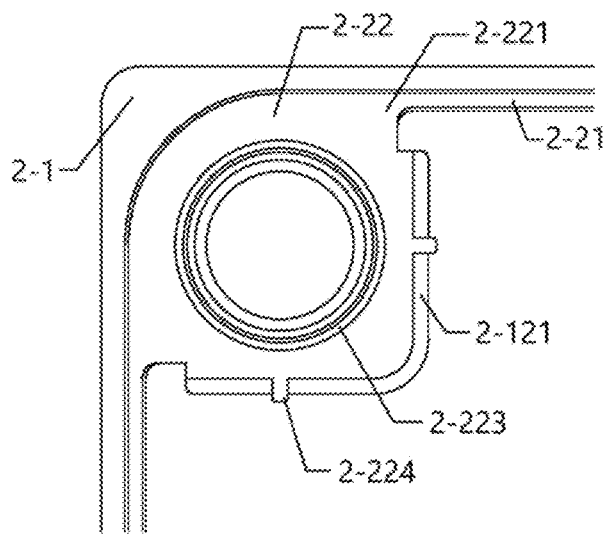
Figure 8:
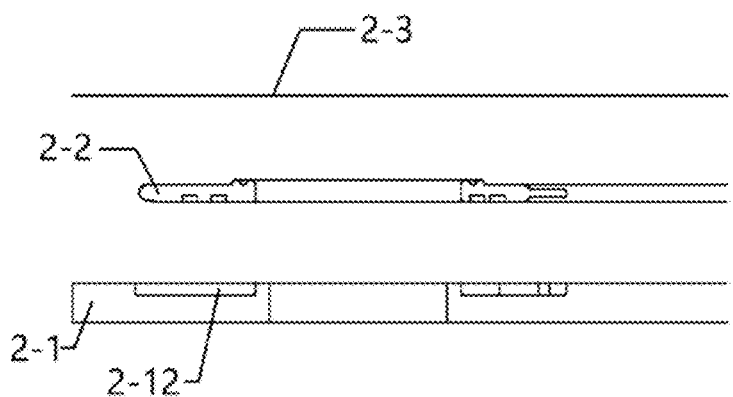
Figure 9:
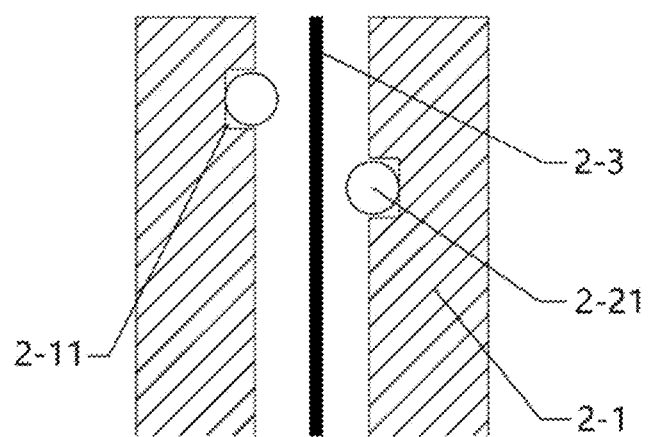

FIG. 5 is a schematic structural diagram of the sealing rubber of the present invention;

FIG. 6 is a rear view of the sealing rubber of the present invention;

FIG. 7 is a assembled diagram of the sealing rubber and the electrode frame of the present invention;

FIG. 8 is a schematic structural diagram of the diaphragm, the sealing rubber and an electrode frame of the present invention; and FIG. 9 is a schematic structural diagram of the diaphragm side seal the present invention;

Wherein: 2-1. Electrode frame; 2-11. Wire sealing groove; 2-12. Gasket sealing groove; 2-121. The non-contact area of the gasket sealing groove and the wire sealing groove; 2-2. Sealing rubber; 2-21. Sealing wire; 2-22. Sealing gasket; 2-221 The connection area of the gasket sealing groove and the wire sealing groove; 2-222. Compressive deformed structure; 2-223. Annular convex structure; 2-224. Sealing gasket positioning structure; 2-3. Diaphragm.

Detailed Description of the Preferred Embodiments

The following non-limiting examples are provided to enable one of ordinary skilled in the art to understand the present invention more thoroughly, but not to limit the present invention in any respect.

Example 1

Figure 1:
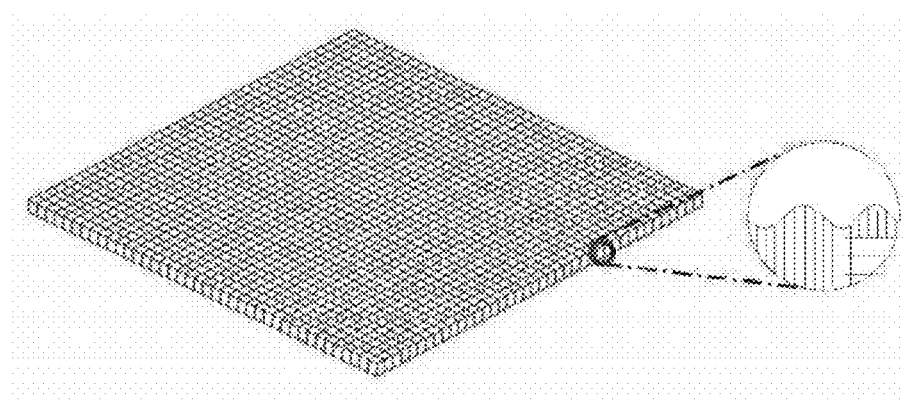
FIG. 1 is a perspective view of a fiber structure of an electrode of the present invention.
Figure 2:
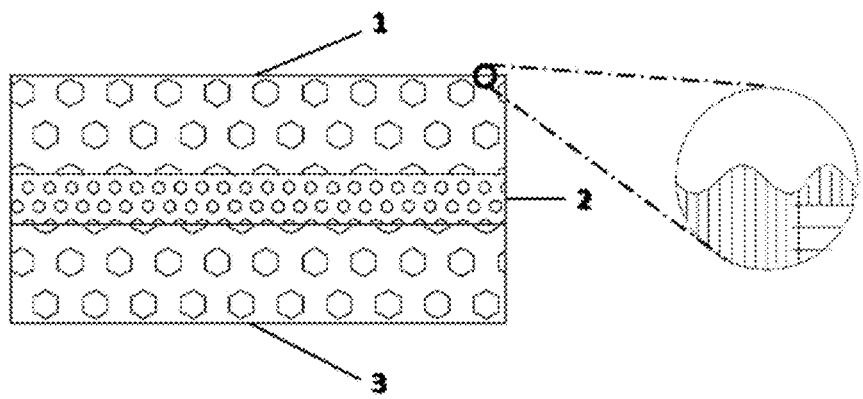
FIG. 2 is a structural diagram of the three-layer electrode of the present invention.

As shown in FIG. 2, an electrode structure comprises three layers of electrode fibers, which are an electrode fiber layer 1 near a bipolar plate, an electrode fiber layer 2 located at a center and an electrode fiber layer 3 near an ion membrane side, wherein the three layers of raw materials are all polyacrylonitrile-based material, a density ratio of the vertical tow and the parallel tow is 6:4, and a diameter of the vertical tow is 6 μm; the structure of the electrode fiber layer 1 and the electrode fiber layer 3 is as follows: porosity of 95% and thickness of 3 mm; and the electrode fiber layer 2 has a porosity of 92.5% and a thickness of 1.5 mm, and the surface contacting with the graphite bipolar plate or the ion membrane is provided with a convex spinous structure and has a high and low undulation shape. When the electrode is in close contact with the bipolar plate with an overall porosity reaches 91%, the vertical resistivity thereof is recorded, then the electrode is assembled into a 5 W single cell under same compression conditions, and the overall porosity and the compression ratio of each layer after compression of the electrode are recorded. The 5 W single cell is charged and discharged in a constant current mode of 80 mA/cm$^2$, and the energy efficiency conversion of the stable cycle of the single cell is recorded.

Comparative Example 1: the electrode has the same apparent size as in Example 1, and the structure thereof is a conventional structure (no multiple fiber layers, no spinous protrusion on the surface, and a porosity of 92%). Such electrode is used to assemble the same 5 W single cell as in Example 1, wherein the porosity of the compressed electrode is 91%. The electrical performance test is conducted and the relative parameters are recorded, and the test data is given in Table 1.

TABLE 1

| Item | ⊥ Resistivity/ Ω · mm | Energy Efficiency/ %@80 mA/cm$^2$ | Compressive Deformed Amount/% | Compressed Porosity/% |
| --- | --- | --- | --- | --- |
| Example 1 | 5.5 | 87.5 | fiber layers 1 and 3: 35 fiber layer 2: 22.5 | the porosity of each fiber layer is basically the same, all equal to 91 |
| Comparative Example 1 | 6 | 86 | 20 | 91 |

Example 2

Figure 3:
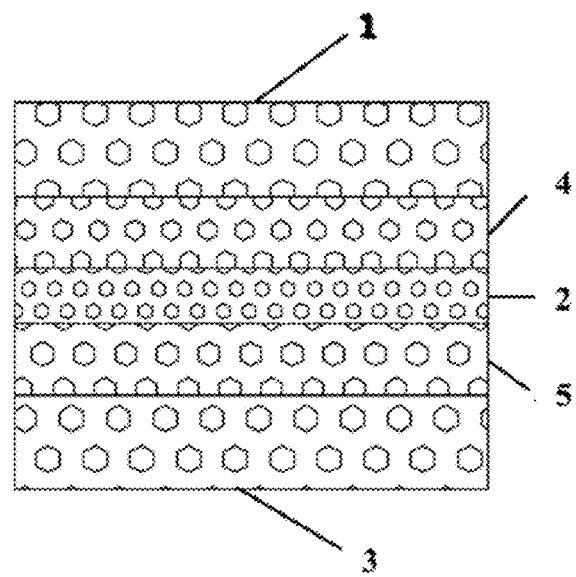
FIG. 3 is a structural diagram of the five-layer electrode of the present invention.
Figure 4:
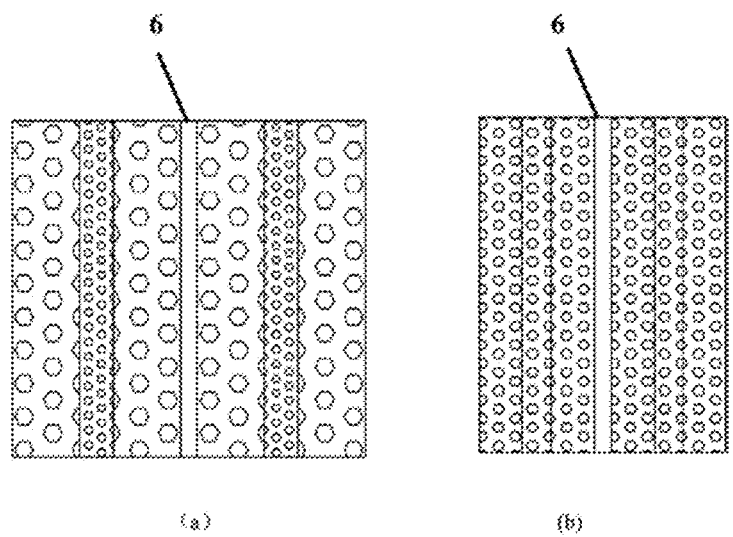
FIG. 4 is a side comparison diagram of the multilayer electrode structure before and after compression.

As shown in FIG. 3, an electrode structure comprises five layers of electrode fibers, which are an electrode fiber layer 1 near a bipolar plate, an electrode fiber layer 2 located at a center and an electrode fiber layer 3 near an ion membrane side, an electrode fiber layer 4 disposed between the electrode fiber layer 1 and the center electrode fiber layer 2, and an electrode fiber layer 5 disposed between the electrode fiber layer 2 and the electrode fiber layer 3, wherein the five layers of raw materials are all polyacrylonitrile-based material, a density ratio of the vertical tow to the parallel tow is 7:3, and a diameter of the vertical tow is 18 μm. The structure of the electrode fiber layer 1 and the electrode fiber layer 3 is as follows: a porosity of 94% and a thickness of 2 mm; the structure of the electrode fiber layer 4 and the electrode fiber layer 5 is as follows: a porosity of 93% and a thickness of 1 mm and the electrode fiber layer 2 has a porosity of 92% and a thickness of 0.5 mm. When the electrode is in close contact with the bipolar plate with an overall porosity reaches 91%, the vertical resistivity thereof is recorded, then the electrode is assembled into a 10 kW stack, and the overall porosity and the compression ratio of each layer after electrode compression are recorded, the data is given in Table 2. The above 10 kW stack is integrated into a 100 kW/100 kWh battery system, and is charged and discharged in a constant current mode of 80 mA/cm². The energy efficiency conversion of its stable cycles is recorded, and the test data is given in Table 2. Comparative Example 2: the electrode has the same apparent size as in Example 2, and the structure thereof is a conventional structure (no multiple fiber layers, and a porosity of 93%). Such electrode is used to assemble the same 100 kW/100 kWh battery system as in Example 2, wherein the porosity after compression of the electrode is 91%. The electrical performance test is conducted and the relative parameters are recorded, and the test data is given in Table 2.

TABLE 2

| Item | ⊥ Resistivity/ Ω · mm | Energy Efficiency/ %@80 mA/cm² | Compressive Deformed Amount/% | Compressed Porosity/% |
|---|---|---|---|---|
| Example 2 | 8.0 | 85.3 | fiber layers 1 and 3: 30 fiber layer 2: 20 fiber layers 4 and 5: 25 | the porosity of each fiber layer is basically the same, all equal to 91 |
| Comparative example 2 | 8.4 | 82.4 | 25 | 91 |

Example 3

As shown in FIG. 3, an electrode structure comprises five layers of electrode fibers, which are an electrode fiber layer 1 near a bipolar plate side, an electrode fiber layer 2 located at a center and an electrode fiber layer 3 near an ion membrane side, an electrode fiber layer 4 disposed between the electrode fiber layer 1 and the electrode fiber layer 2, and an electrode fiber layer 5 disposed between the electrode fiber layer 2 and the electrode fiber layer 3. Wherein the raw materials of the electrode fiber layer 1, electrode fiber layer 3, electrode fiber layer 4 and electrode fiber layer 5 are polyacrylonitrile-based material, while the raw material of the electrode fiber layer 2 is rayon-based material, a density ratio of the vertical tow to the parallel tow is 6.5:3.5, and a diameter of the vertical tow is 7 μm. The structure of the electrode fiber layer 1 and the electrode fiber layer 3 is as follows: a porosity of 95%, a thickness of 2 mm, and the surface contacting with the carbon composite bipolar plate or the ion membrane is provided with a convex spinous structure and has a high and low undulation shape; the structure of the electrode fiber layer 4 and the electrode fiber layer 5 is as follows: a porosity of 93.5% and a thickness of 1 mm; and the electrode fiber layer 2 has a porosity of 93% and a thickness of 0.5 mm. When the electrode is in close contact with the bipolar plate with an overall porosity reaches 91%, the vertical resistivity thereof is recorded, then this electrode is assembled into a 30 kW stack, and the overall porosity and the compression ratio of each layer after compression of the electrode are recorded, the data is given in Table 3. The 30 kW stack is charged and discharged in a constant current mode of 80 mA/cm². The energy efficiency conversion of its stable cycles is recorded, and the test data is given in Table 3. Comparative Example 3: the electrode has the same apparent size as in Example 3, and the structure thereof is a conventional structure (no multiple fiber layers, no spinous protrusion on its surface, and a porosity of 92%). Such electrode is used to assemble the same 30 kW stack as in Example 3, wherein the porosity after compression of the electrode is 91%. The electrical performance test is conducted and the relative parameters are recorded, and the test data is given in Table 3.

TABLE 3

| Item | ⊥ Resistivity/ Ω · mm | Energy Efficiency/ %@80 mA/cm² | Compressive Deformed Amount/% | Compressed Porosity/% |
|---|---|---|---|---|
| Example 3 | 5.8 | 87.2 | fiber layers 1 and 3: 35 fiber layer 2: 25 fiber layers 4 and 5: 27.5 | the porosity of each fiber layer is basically the same, all equal to 91 |
| Comparative Example 3 | 6.2 | 85.7 | 20 | 91 |

Example 4

An electrode structure comprises five layers of electrode fibers, which are an electrode fiber layer 1 near the bipolar plate side, an electrode fiber layer 2 located at a center and an electrode fiber layer 3 near the ion membrane side, an electrode fiber layer 4 disposed between the electrode fiber layer 1 and the electrode fiber layer 2, and an electrode fiber layer 5 disposed between the electrode fiber layer 2 and the electrode fiber layer 3. Wherein the raw materials of the electrode fiber layer 1, electrode fiber layer 2, electrode fiber layer 3, electrode fiber layer 4 and electrode fiber layer 5 are polyacrylonitrile-based material, a density ratio of the vertical tow to the parallel tow is 6:4, and a diameter of the vertical tow is 15 μm. The structure of the electrode fiber layer 1 and the electrode fiber layer 3 is as follows: a porosity of 94% and a thickness of 1.5 mm; the structure of the electrode fiber layer 4 and the electrode fiber layer 5 is as follows: a porosity of 93% and a thickness of 1 mm; and the electrode fiber layer 2 has a porosity of 92% and a thickness of 0.5 mm. When the electrode is in close contact with the bipolar plate with an overall porosity reaches 91%, the vertical resistivity thereof is recorded, then this electrode is assembled into a 5 W single cell, and the overall porosity and the compression ratio of each layer after compression of the electrode are recorded, the data is given in Table 4. The single cell is charged and discharged in a constant current mode of 80 mA/cm². The energy efficiency conversion of its stable cycles is recorded, and the test data is given in Table 4. Comparative Example 4: the electrode has the same apparent size as in Example 4, and the structure thereof is a conventional structure (no multiple fiber layers, no spinous protrusion on its surface, and a porosity of 93%). Such electrode is used to assemble the same 5 W single cell as in Example 4, wherein the porosity after compression of the electrode is 91%. The electrical performance test is conducted and the relative parameters are recorded, and the test data is given in Table 4.

TABLE 4

| Item | ⊥ Resistivity/ Ω · mm | Energy Efficiency/ %@80 mA/cm² | Compressive Deformed Amount/% | Compressed Porosity/% |
|---|---|---|---|---|
| Example 4 | 7.4 | 85.8 | fiber layers 1 and 3: 30 fiber layer 2: 20 fiber layers 4 and 5: 25 | the porosity of each fiber layer is basically the same, all equal to 91 |
| Comparative Example 4 | 7.8 | 83.3 | 25 | 91 |

Example 5

An electrode structure comprises five layers of electrode fibers, which are an electrode fiber layer 1 near the bipolar plate side, an electrode fiber layer 2, located at a center and an electrode fiber layer 3 near an ion membrane side, an electrode fiber layer 4 disposed between the electrode fiber layer 1 and the electrode fiber layer 2, and an electrode fiber layer 5 disposed between the electrode fiber layer 2 and the electrode fiber layer 3, wherein the raw materials of the electrode fiber layer 1, electrode fiber layer 2, electrode fiber layer 3, electrode fiber layer 4 and electrode fiber layer 5 are polyacrylonitrile-based material, a density ratio of the vertical tow to the parallel tow is 6:4, and a diameter of the vertical tow is 10 μm. Structures of the electrode fiber layer 1 and the electrode fiber layer 3 are as follows: a porosity of 96% and a thickness of 1.75 mm; structures of the electrode fiber layer 4 and the electrode fiber layer 5 are as follows: a porosity of 94% and a thickness of 1.25 mm; and the electrode fiber layer 2 has a porosity of 93% and a thickness of 0.75 mm. When the electrode is in close contact with the bipolar plate with an overall porosity reaches 91%, the vertical resistivity thereof is recorded, then this electrode is assembled into a 5 W single cell, and the overall porosity and the compression ratio of each layer after compression of the electrode are recorded, the data is given in Table 5. The single cell is charged and discharged in a constant current mode of 80 mA/cm². The energy efficiency conversion of its stable cycles is recorded, and the test data is given in Table 5.

TABLE 5

| Item | ⊥ Resistivity/ Ω · mm | Energy Efficiency/ %@80 mA/cm² | Compressive Deformed Amount/% | Compressed Porosity/% |
|---|---|---|---|---|
| Example 5 | 6.5 | 86.0 | fiber layers 1 and 3: 40 fiber layer 2: 25 fiber layers 4 and 5: 30 | the porosity of each fiber layer is basically the same, all equal to 91 |
| Comparative example 5 | 6.8 | 84.8 | 25 | 91 |

Comparative Example 5: the electrode has the same apparent size as in Example 5, and the structure thereof is a conventional structure (no multiple fiber layers, no spinous protrusion on its surface, and a porosity of 93%). Such electrode is used to assemble the same 5 W single cell as in Example 5, wherein the porosity after compression of the electrode is 91%. The electrical performance test is conducted and the relative parameters are recorded, and the test data is given in Table 5.

Example 6

An electrode structure comprises five layers of electrode fibers, which are an electrode fiber layer 1 near the bipolar plate side, an electrode fiber layer 2 located at a center and an electrode fiber layer 3 near the ion membrane side, an electrode fiber layer 4 disposed between the electrode fiber layer 1 and the electrode fiber layer 2, and an electrode fiber layer 5 disposed between the electrode fiber layer 2 and the electrode fiber layer 3, wherein the raw materials of the electrode fiber layer 1, electrode fiber layer 2, electrode fiber layer 3, electrode fiber layer 4 and electrode fiber layer 5 are polyacrylonitrile-based material, a density ratio of the vertical tow to the parallel tow is 6:4, and a diameter of the vertical tow is 9 μm. Structures of the electrode fiber layer 1 and the electrode fiber layer 3 are as follows: a porosity of 95% and a thickness of 1.6 mm; structures of the electrode fiber layer 4 and the electrode fiber layer 5 are as follows: a porosity of 93% and a thickness of 1.5 mm; and the electrode fiber layer 2 has a porosity of 90% and a thickness of 1 mm. When the electrode is in close contact with the bipolar plate with an overall porosity reaches 91%, the vertical resistivity thereof is recorded, then this electrode is assembled into a 5 W single cell, and the overall porosity and the compression ratio of each layer after compression of the electrode are recorded, the data is given in Table 6. The single cell is charged and discharged in a constant current mode of 80 mA/cm². The energy efficiency conversion of its stable cycles is recorded, and the test data is given in Table 6.

TABLE 6

| Item | ⊥ Resistivity/ Ω · mm | Energy Efficiency/ %@80 mA/cm² | Compressive Deformed Amount/% | Compressed Porosity/% |
|---|---|---|---|---|
| Example 6 | 6.0 | 86.5 | fiber layers 1 and 3: 35 fiber layer 2: 10 fiber layers 4 and 5: 25 | the porosity of each fiber layer is basically the same, all equal to 91 |
| Comparative example 6 | 6.6 | 85.1 | 20 | 91 |

Comparative Example 6: the electrode has the same apparent size as in Example 6, and the structure thereof is a conventional structure (no multiple fiber layers, no spinous protrusion on its surface, and a porosity of 92%). Such electrode is used to assemble the same 5 W single cell as in Example 6, wherein the porosity after compression the electrode is 91%. The electrical performance test is conducted and the relative parameters are recorded, and the test data is given in Table 6.

Example 7

An electrode structure comprises three layers of electrode fibers, which are an electrode fiber layer 1 near the bipolar plate side, an electrode fiber layer 2 located at a center and an electrode fiber layer 3 near the ion membrane side, wherein the raw material of the electrode fiber layer 2 is rayon-based material, the raw materials of the electrode fiber layer 1 and the electrode fiber layer 3 are polyacrylonitrile-based material, a density ratio of the vertical tow to the parallel tow is 6:4, and a diameter of the vertical tow is 12 μm. Structures of the electrode fiber layer 1 and the electrode fiber layer 3 are as follows: a porosity of 93% and a thickness of 1.5 mm; and the electrode fiber layer 2 has a porosity of 91.5% and a thickness of 1 mm. When the electrode is in close contact with the bipolar plate with an overall porosity reaches 91%, the vertical resistivity thereof is recorded, then the electrode is assembled into a 5 W single cell, and the overall porosity and the compression ratio of each layer after compression of the electrode are recorded, the data is given in Table 7. The single cell is charged and discharged in a constant current mode of 80 mA/cm². The energy efficiency conversion of its stable cycles is recorded, and the test data is given in Table 7.

TABLE 7

| Item | ⊥ Resistivity/ Ω · mm | Energy Efficiency/ %@80 mA/cm² | Compressive Deformed Amount/% | Compressed Porosity/% |
| --- | --- | --- | --- | --- |
| Example 7 | 6.8 | 85.4 | fiber layers 1 and 3: 25 fiber layer 2: 20 | the porosity of each fiber layer is basically the same, all equal to 91 |
| Comparative example 7 | 7.2 | 84.2 | 25 | 91 |

Comparative Example 7: the electrode has the same apparent size as in Example 7, and the structure thereof is a conventional structure (no multiple fiber layers, no spinous protrusion on its surface, and a porosity of 92%). Such electrode is used to assemble the same 5 W single cell as in Example 7, wherein the porosity after compression of the electrode is 91%. The electrical performance test is conducted and the relative parameters are recorded, and the test data is given in Table 7.

Example 8

The growing demand for traditional energy in modern economic and social development has made the problem of its insufficient supply increasingly concerned. People had to seek renewable energy source such as wind energy and solar energy. In recent years, the new energy as represented by the wind energy and the solar energy has occupied a place of energy supply, and its proportion has being constantly increasing as the demand increases. However, due to the weather, the contradiction between supply and demand caused by intermittent power generation is more prominent, it is imperative to develop large-scale energy storage technology.

As a way of large-scale energy storage—the generation and development of the flow battery provide a good complement for the aforementioned deficiencies of the new energy sources. The flow battery has features of good safety, long service life, large power storage capacity, adjustable power and capacity separation, flexible location, clean and environmental protection, which ensures stable output of new energy such as the wind energy and the solar energy after storage adjustment, thereby playing an important role in achieving scaled power management, grid assist, voltage control and large uninterruptible power supplies.

Since the single cell of the flow battery has small standard open circuit voltage, to meet the practical application, a certain number of single cells need to be assembled in series into a stack to obtain the required voltage. The stack structures of the stack impose high demands on its sealing. At present, the common sealing methods of the stack include stranded wire sealing, planar sealing, sheet surface sealing, adhesion, welding, groove matching, and the like. However, the above several sealing methods are simple, which cannot completely solve the problems of internal leakage and external leakage of the electrolyte in the stack.

a. Although the cost of the stranded wire sealing is low, the sealing effect on the common flow hole of the electrolyte is not good, and the electrolyte is easily leaked to the outside of the stack;

b. Although the sealing effect of the sheet surface sealing is slightly better, it has the problem of being expensive and unable to be used twice; and c. Adhesive, welding and groove matching modes have poor practicability due to a series of problems that these modes are incapable of disassembly and secondary use after the single cell of the stack is damaged, and the positive electrode frame and the negative electrode frame are not precisely matched.

In addition, the researchers found that if there is no separate insulation treatment on the common flow channel hole of the diaphragm electrolyte, after long-term use of the stack, an internal leakage of the electrolyte may occur at the common flow channel hole of the diaphragm electrolyte, and the diaphragm as the conductive medium may result in leakage inside the stack, thereby causing chemical and electrochemical corrosion to occur in the common flow channel hole of the electrolyte of the diaphragm, to generate precipitates or crystals of the active materials, causing the positive and negative electrolytes to cross each other on both sides of the diaphragm, destroying the diaphragm and its sealing structure. The occurrence of the above phenomenon will lead to the attenuation of the performance of the stack, which in turn affects the overall performance and life of the flow battery.

The present invention solves the above problems through a new sealing structure of a flow battery stack.

The present invention provides a sealing structure of a flow battery stack, the sealing structure of the flow battery stack comprises a sealing rubber, and the sealing rubber is formed by connecting a plurality of sealing gaskets by a sealing wire, wherein the sealing gaskets is provided with an electrolyte common flow channel hole, one side of the sealing gasket is provided with a compressive deformation structure, and the other side of the sealing gasket is provided with an annular convex structure.

The material of the sealing rubber of the present invention is preferably a fluorine rubber or an ethylene propylene diene monomer.

A diameter of the sealing wire of the present invention is preferably 1-3 mm.

A thickness of the sealing gasket of the present invention is preferably 1-3 mm.

In the present invention, the shortest distance from the outer edge of the sealing gasket to the center of the common flow channel of the electrolyte is preferably 1.5-3 times the radius of the electrolyte common flow channel of the electrolyte.

In the present invention, the sealing gasket preferably has at least two layers of the annular convex structures, wherein the inner diameter of the innermost annular convex structure is greater than or equal to the outer diameter of the common flow channel hole of the electrolyte.

In the present invention, the spacing between the annular convex structures of each layer is 0.5-3 mm, more preferably 1-2 mm.

In the present invention, the cross-sectional shape of the annular convex structures of each layer is preferably rectangle, semicircle or inverted trapezoid, more preferably rectangle.

The compression deformation structure of the present invention is preferably a plurality of grooves.

The shape of the grooves of the present invention is preferably arc, rectangle or triangle.

In the present invention, the sealing gasket is provided with at least one sealing gasket positioning structures, more preferably at least two sealing gasket positioning structures. The thickness of the sealing gasket positioning structure of the present invention is preferably 0.3-0.8 times the thickness of the sealing gasket, more preferably 0.4-0.6 times the thickness of the sealing gasket.

The Shore hardness of the sealing rubber of the present invention is preferably 40-100, more preferably 60-80.

The compression ratio of the sealing gasket of the present invention is preferably 10-30%.

In the present invention, the sealing structure of the flow battery stack preferably further comprises an electrode frame, the electrode frame is provided with a wire sealing groove and a gasket sealing groove, and the sealing wire and the sealing gasket are respectively disposed in the wire sealing groove and the gasket sealing groove, wherein the filling ratio of the sealing gasket to the gasket sealing groove is 90-95%, and the filling ratio of the sealing wire to the wire sealing groove is 90-95%.

In the present invention, the connection area of the gasket sealing groove and the wire sealing groove is preferably in close contact with the sealing gasket, and the size of the other area of the gasket sealing groove is larger than the size of the sealing gasket.

The compression deformation structure of the sealing gasket of the present invention is disposed in the gasket sealing groove.

In the present invention, the width of the wire sealing groove is preferably 1-5 mm, the depth of the wire sealing groove is preferably 1-5 mm, and the distance from the outer edge of the gasket sealing groove to the outer edge of the electrode frame is preferably 5-20 mm.

In the present invention, the sealing structure of the flow batter stack preferably further comprises two electrode frames, two sealing rubbers and a diaphragm; the distance from the wire sealing grooves of the two electrode frames to the outer edge of the respective electrode frame is different, the sealing rubber is placed in a sealing groove of the electrode frame, and the sealing gasket of the sealing rubber is provided with one side of the compression deformation structure in contact with the electrode frame and the other side is in contact with the diaphragm, sealing the diaphragm at the common flow channel hole of the electrolyte is to cover the electrolyte common flow channel hole of the diaphragm on an outermost annular convex structure of one of the sealing gaskets, wherein one side of the diaphragm is in contact with the sealing gasket of one of the sealing rubbers, and the other side is in contact with the sealing wire of another sealing rubber, and sealing the diaphragm at the non-electrolyte common flow channel hole is that the diaphragm is sealed by the sealing wire of the two misaligned sealing rubbers, that is, the sealing structure at the common flow channel hole of the diaphragm is sealed by the sealing wires above and below the diaphragm, wherein the sealing wire on one side is in contact with the sealing gasket, while the other side is the wire sealing structure.

In the present invention, the electrolyte common flow channel holes of the electrode frame, the sealing gasket and the diaphragm have a same circle center, and diameters of the electrolyte common flow channel holes of the diaphragm, the sealing gasket and the electrode frame sequentially increase 1-5 mm.

In the present invention, the sealing wire of one of the sealing rubbers and the sealing wire of the other sealing rubbers are sealed to the dislocation side of the diaphragm, and the spacing between these two sealing wires is preferably greater than 0.5 mm, further preferably greater than 2 mm.

The annular convex of the present invention has the following functions: a. ensuring accurate installation and positioning of the diaphragm; b. preventing the electrolyte common flow channel hole of the diaphragm from shifting; and c. sealing the inner wall section of the electrolyte common flow channel hole of the diaphragm, preventing flow battery stack electrolyte from leaking through the inner wall section of the common flow channel of the diaphragm to the outside of the stack and causing leakage to outside the stack and the occurrence of the short circuit of the single cell.

The present invention has following beneficial effects:

The present invention respectively seals the hole and the periphery of the common flow channel of the electrolyte of the diaphragm. The diaphragm side sealing adopts internal and external embedded wire sealing to realize double layer protection. The internal and external leakage protection is realized by the surface sealing at the position of the common flow channel of the electrolyte, and the volume of all the sealing parts is smaller than the volume of the corresponding sealing groove.

The present invention has good sealing property, prolongs the life of the flow battery, and prevents economic loss caused by the frequent leakage of the electrolyte of the flow battery, and has higher secondary utilization and stronger pressure bearing capacity, compared with the traditional single wire sealing and single planar sealing.

The symmetrical wire sealing embedded inside and outside used in the diaphragm side in the present invention not only saves materials, but also reduces the resistance of the battery, so that the battery system runs faster, and the charge and discharge costs are lower.

The invention adopts a surface sealing mode at the position of the common flow channel of the electrolyte to make the sealing performance better, wherein the annular convex structure increases the compression ratio, so that the electrolyte is less likely to leak.

Example 9

As shown in FIG. 8 and FIG. 9, a sealing structure of a flow battery stack, the sealing structure the flow battery stack comprises two electrode frames 2-1, two fluorine sealing rubbers 2-2 having a Shore A hardness of 60, and a diaphragm 2-3 provided with an electrolyte common flow channel hole; the sealing rubber 2-2 (as shown in FIGS. 5-7) is formed by connecting two sealing gaskets 2-22 provided with common flow channel hole of the electrolyte by a sealing wire 2-21, a diameter of the sealing wire 2-21 is 1 mm, a thickness of the sealing gasket 2-22 is 1 mm, a compression ratio of the sealing gasket is 10%, the shortest distance from the outer edge of the sealing gasket 2-22 to the center of the common flow channel of the electrolyte is 1.5 times the radius of the common flow channel of the electrolyte, one side of the sealing gasket 2-22 is provided with a compression deformation structure 2-222, wherein the compression deformation structure 2-222 is a plurality of arc-shaped grooves, the other side of the sealing gasket 2-22 is provided with two layers of annular convex structures 2-223, wherein the convex cross section of the annular convex structures 2-223 is rectangular, and the spacing between the two layers of the annular convex structures 2-223 is 0.5 mm, and the sealing gasket 2-22 is provided with two sealing gasket positioning structures 2-224, wherein the thickness of the sealing gasket positioning structure 2-224 is 0.3 times the thickness of the sealing gasket 2-22; the electrode frames 2-1 is provided with a wire sealing groove 2-11 and a gasket sealing groove 2-12, wherein the width of the wire sealing groove 2-11 is 1 mm, the depth of the wire sealing groove 2-11 is 1 mm, the distance between the wire sealing grooves 2-11 of the two electrode frame 2-1 and the outer edge of the respective electrode frame 2-1 are respectively 5 mm and 1.0 mm, the sealing wire 2-21 and the sealing gasket 2-22 are respectively placed in the wire sealing groove 2-11 and the gasket sealing groove 2-12, one side of the sealing gasket 2-22 provided with compression deformation structure 2-222 is in contact with the electrode frame 2-1, the filing ratio of the sealing gasket 2-22 to the gasket sealing groove 2-12 is 90%, the filing ratio of the sealing wire 2-21 to the wire sealing groove 2-12 is 90%, sealing the diaphragm 2-3 at the common flow channel hole of the electrolyte is to cover the electrolyte common flow channel hole of the diaphragm 2-3 on the outermost annular convex structure 2-223 of one of the sealing gaskets 2-22, wherein one side of the diaphragm 2-3 is in contact with the sealing gasket 2-22 of one of the sealing rubbers 2-2, and the other side is in contact with the sealing wire 2-21 of the other sealing rubber 2-2, the gasket sealing groove 2-12 and the wire sealing groove 2-11 are in close contact with the sealing gasket 2-22, and the size of the other areas of the gasket sealing groove 2-12 is larger than the size of the sealing gasket 2-22; and sealing the diaphragm 2-3 at the non-electrolyte common flow channel hole is that the diaphragm 2-3 is sealed by the sealing wire 2-21 of the two misaligned sealing rubbers 2-2, wherein the spacing of the two sealing wires 2-21 is 0.5 mm, the center of the electrolyte common flow hole of the electrode frame 2-1, the sealing gasket 2-2 and the diaphragm 2-3 are same, and the diameter of the electrolyte common flow hole of the diaphragm 2-3, the sealing gasket 2-2 and the electrode frame 2-1 sequentially increase 1 mm.

Example 10

As shown in FIGS. 5-9, a sealing structure of a flow battery stack, the sealing structure of the flow battery stack comprises two electrode frames 2-1, two ethylene propylene diene monomer sealing rubbers 2-2 having a Shore A hardness of 80, and a diaphragm 2-3 provided with an electrolyte common flow channel hole; the sealing rubber 2-2 is formed by connecting two sealing gaskets 2-22 provided with an electrolyte common flow channel hole by a sealing wire 2-21, the diameter of the sealing wire 2-21 is 3 mm, the thickness of the sealing gasket 2-22 is 3 mm, the compression ratio of the sealing gasket 2-22 is 30%, the shortest distance from the outer edge of the sealing gasket 2-22 to the center of the electrolyte common flow channel is 3 times the radius of the electrolyte common flow channel, one side of the sealing gasket 2-22 is provided with a compression deformation structure 2-222 wherein the compression deformation structure 2-222 is a plurality of arc-shaped grooves, the other side of the sealing gasket 2-22 is provided with two layers of annular convex structures 2-223, wherein the convex protruding section of the annular convex structures 2-223 have a inverted trapezoidal shape, and the spacing between the two layers of the annular convex structures 2-223 is 3 mm, and the sealing gasket 2-22 is provided with two sealing gasket positioning structures 2-224, wherein the thickness of the sealing gasket positioning structure 2-224 is 0.8 times the thickness of the sealing gasket 2-22; the electrode frame 2-1 is provided with a wire sealing groove 2-11 and a gasket sealing groove 2-12, wherein a width of the wire sealing groove 2-11 is 5 mm, the depth of the wire sealing groove 2-11 is 5 mm, the distance from the wire sealing grooves 2-11 of the two electrode frames 2-1 to the outer edge of the respective electrode frame 2-1 are respectively 10 mm and 20 mm, the sealing wire 2-21 and the sealing gasket 2-22 are respectively disposed in the wire sealing groove 2-11 and the gasket sealing groove 2-12, one side of the sealing gasket 2-22 provided with the compression deformation structure 2-222 is in contact with the electrode frame 2-1, the filing ratio of the sealing gasket 2-22 to the gasket sealing groove 2-12 is 95%, the filing ratio of the sealing wire 2-21 to the wire sealing groove 2-12 is 95%, sealing the diaphragm 2-3 at the common flow channel hole of the electrolyte is to cover the electrolyte common flow channel hole of the diaphragm 2-3 on the outermost annular convex structure 2-223 of one of the sealing gaskets 2-22, wherein one side of the diaphragm 2-3 is in contact with the sealing gasket 2-22 of one of the sealing rubbers 2-2, and the other side is in contact with the sealing wire 2-21 of the other sealing rubbers 2-2, the connection area of the gasket sealing groove 2-12 and the wire sealing groove 2-11 closely contacts with the sealing gasket 2-22, and the size of the other area of the gasket sealing groove 2-12 is larger than the size of the sealing gasket 2-22; and sealing the diaphragm 2-3 at the non-electrolyte common flow channel hole is that the diaphragm 2-3 is sealed by the sealing wire 2-21 of the two misaligned sealing rubbers 2-2, wherein the spacing between the two sealing wires 2-21 is 2 mm, the center of the electrolyte common flow hole of the electrode frame 2-1, the sealing gasket 2-2 and the diaphragm 2-3 are same, and the diameter of the electrolyte common flow hole of the diaphragm 2-3, the sealing gasket 2-2 and the electrode frame 2-1 is sequentially increased by 1 mm.

What is claimed is:

1. An electrode structure of a flow battery, comprising an electrode fiber, characterized in that, a density of vertical tows in the electrode fiber is larger than a density of parallel tows, and wherein
    in the electrode fiber per unit volume, a quantity ratio of the vertical tows to the parallel tows is at least 6:4,
    a number of layers of the electrode fiber is an odd number, and a porosity of the electrode fiber of each layer is increased outwardly from a center layer, and
    the porosity of the electrode fiber of the center layer is 92-93%, and the porosity of the electrode fiber of other layers is 93-96%.

2. The electrode structure of the flow battery according to claim 1, characterized in that, the number of layers of the electrode fiber is three, five or seven.

3. The electrode structure of the flow battery according to claim 1, wherein a thickness of each layer of the electrode fiber is no greater than 2.5 mm.

\* \* \* \* \*